(12) United States Patent
Aalto

(10) Patent No.: US 12,025,834 B2
(45) Date of Patent: Jul. 2, 2024

(54) POLARIZATION ROTATORS

(71) Applicant: Teknologian tutkimuskeskus VTT Oy, Espoo (FI)

(72) Inventor: Timo Aalto, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 221 days.

(21) Appl. No.: 17/608,488

(22) PCT Filed: May 7, 2020

(86) PCT No.: PCT/FI2020/050308
§ 371 (c)(1),
(2) Date: Nov. 3, 2021

(87) PCT Pub. No.: WO2020/225484
PCT Pub. Date: Nov. 12, 2020

(65) Prior Publication Data
US 2022/0221648 A1    Jul. 14, 2022

(30) Foreign Application Priority Data
May 7, 2019 (FI) ..................................... 20195374

(51) Int. Cl.
*G02B 6/126* (2006.01)
*G02B 6/26* (2006.01)

(52) U.S. Cl.
CPC ............. *G02B 6/126* (2013.01); *G02B 6/262* (2013.01)

(58) Field of Classification Search
CPC .................................. G02B 6/126; G02B 6/262
See application file for complete search history.

(56) References Cited

U.S. PATENT DOCUMENTS 5,078,512 A    1/1992   Ando
6,236,786 B1   5/2001   Aoki et al.
(Continued)

FOREIGN PATENT DOCUMENTS

JP    H033288104 A    12/1991
JP    2002023004 A    1/2002
(Continued)

OTHER PUBLICATIONS

Arora et al: A twisted periscope arrangement for transporting elliptically polarized light without change in its polarization state. Review of Scientific Instruments, 2010. vol. 81, pp. 123102-1-123102-3.
(Continued)

*Primary Examiner* — Tina M Wong
(74) *Attorney, Agent, or Firm* — Laine IP Oy

(57) ABSTRACT

The invention concerns a polarization rotator, comprising a first waveguide layer containing at least a first waveguide, said first waveguide having an input end and an output end, a second waveguide layer having at least a second waveguide, said second waveguide having an input end and an output end, and at least a first vertical mirror element arranged at the end of at least one of said waveguides to couple light between the output end of the first waveguide and the input end of the second waveguide. The optical axis of said first or second waveguide which has the vertical mirror element at its end is rotated in its waveguide layer at a first angle in order to induce rotation of polarization of light coupled between said first and second waveguides with an amount that corresponds to said first angle.

10 Claims, 13 Drawing Sheets

(56) References Cited

U.S. PATENT DOCUMENTS

| | | |
|---|---|---|
| 6,325,553 B1 | 12/2001 | Deacon et al. |
| 6,355,198 B1 | 3/2002 | Kim et al. |
| 2004/0021940 A1 | 2/2004 | Gunther et al. |
| 2006/0018584 A1 | 1/2006 | Watts et al. |
| 2015/0063744 A1 | 3/2015 | Chen |
| 2015/0078712 A1 | 3/2015 | Brunner et al. |

FOREIGN PATENT DOCUMENTS

| | | |
|---|---|---|
| JP | 2017187709 A | 10/2017 |
| WO | WO0073838 A1 | 12/2000 |
| WO | WO2010016262 A1 | 2/2010 |

OTHER PUBLICATIONS

Jalas et al: Faraday rotation in silicon waveguides. 2017 IEEE 14th international conference on group IV photonics (GFP), pp. 141-142.

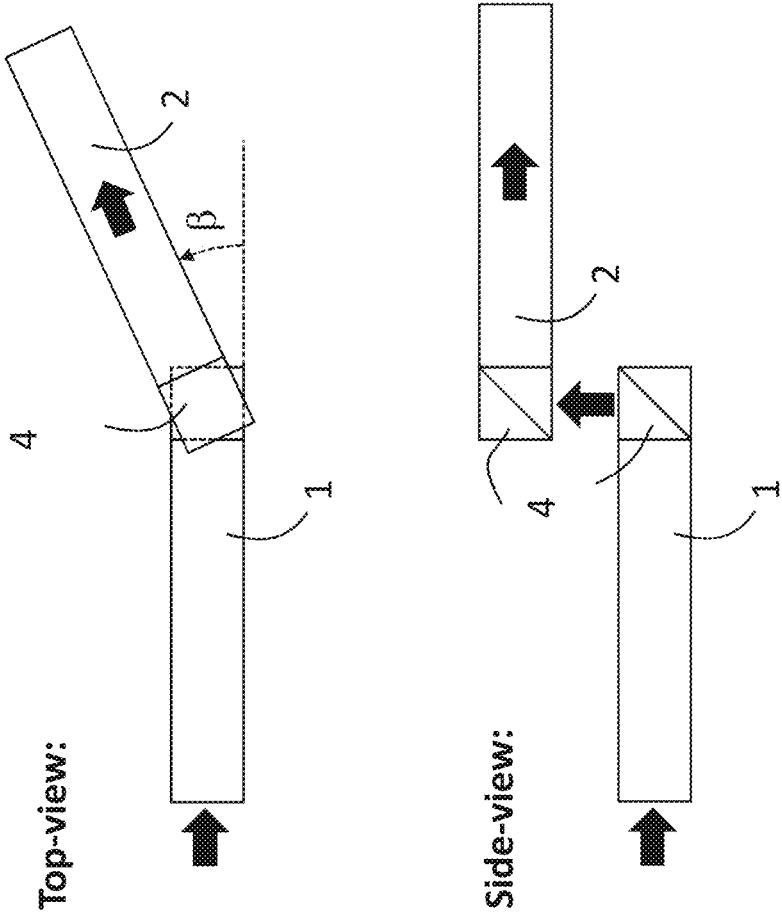

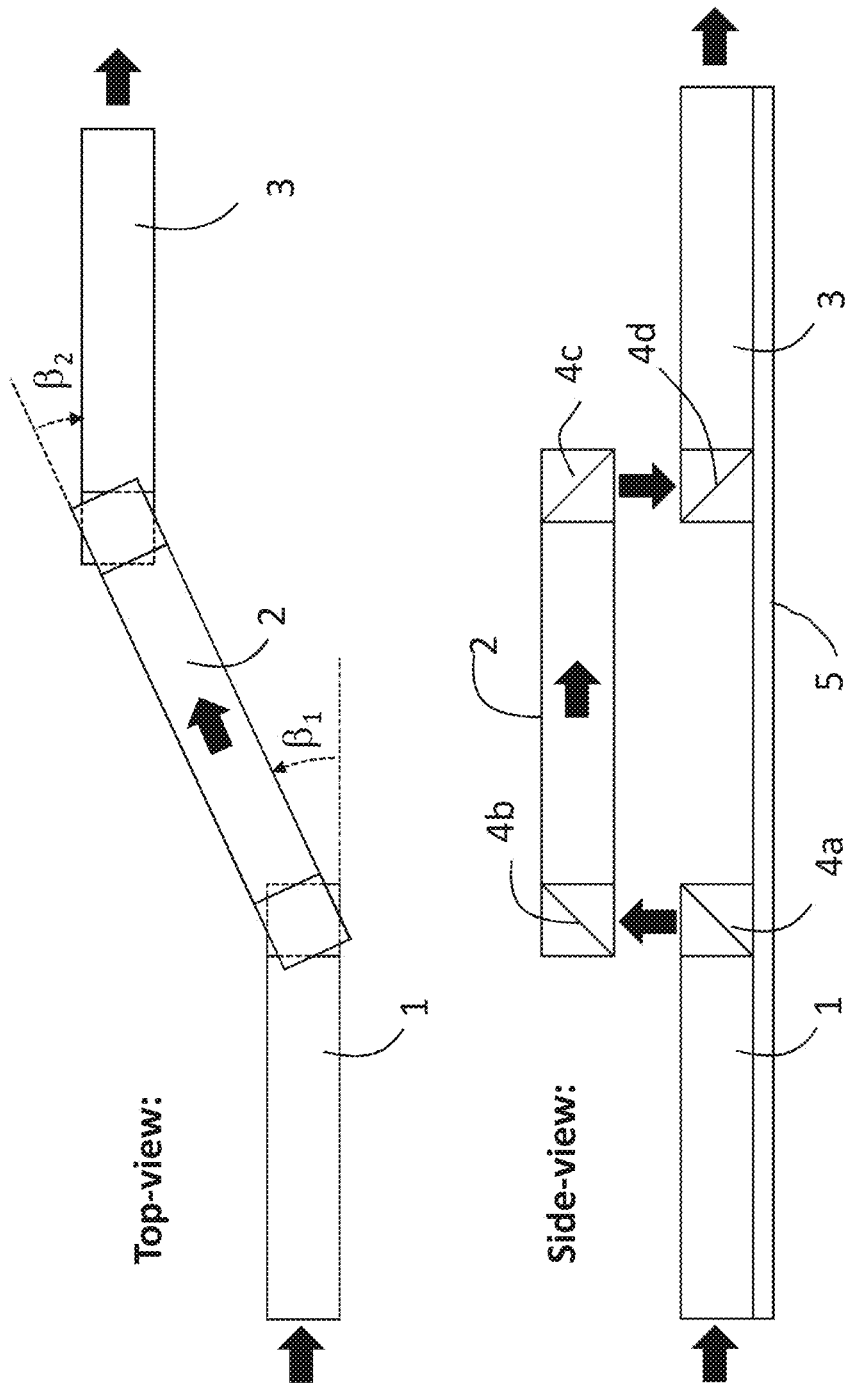

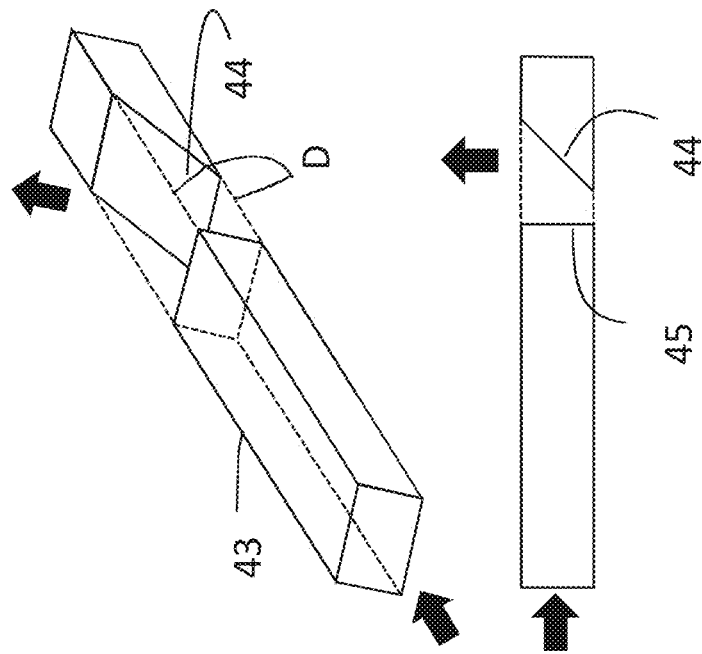
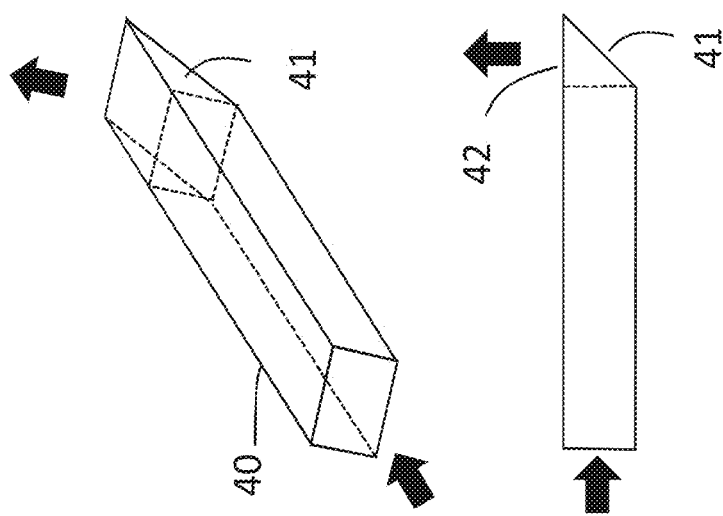
Fig. 4A
Fig. 4B

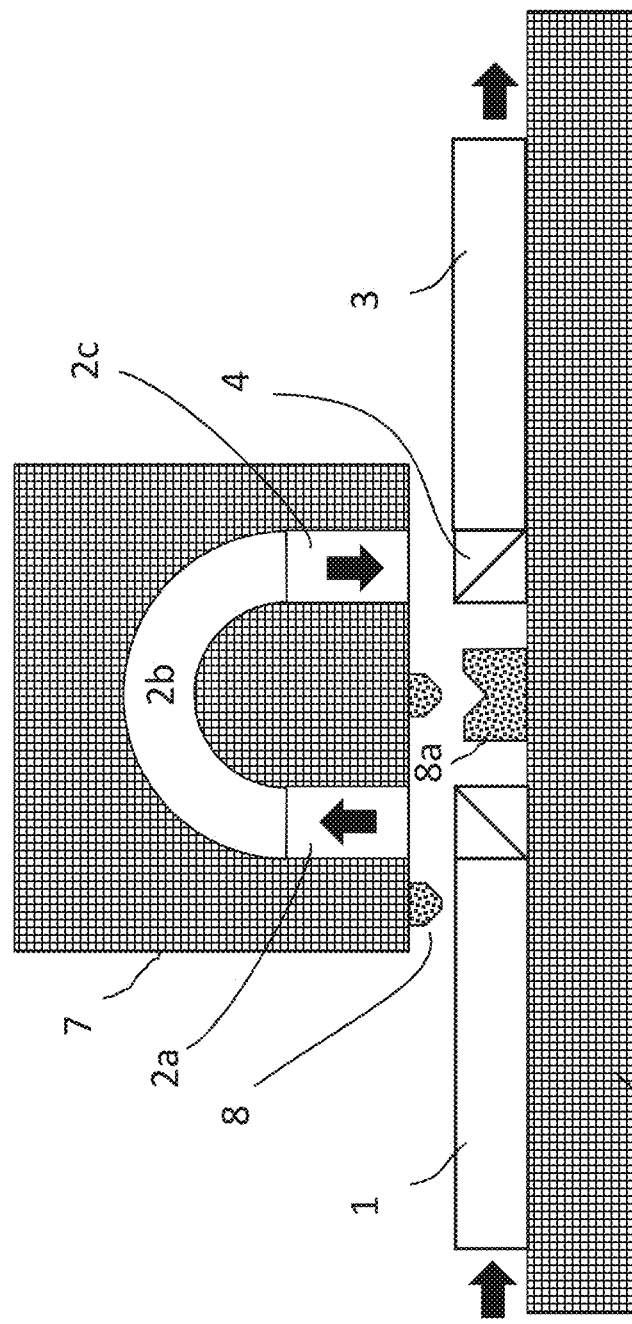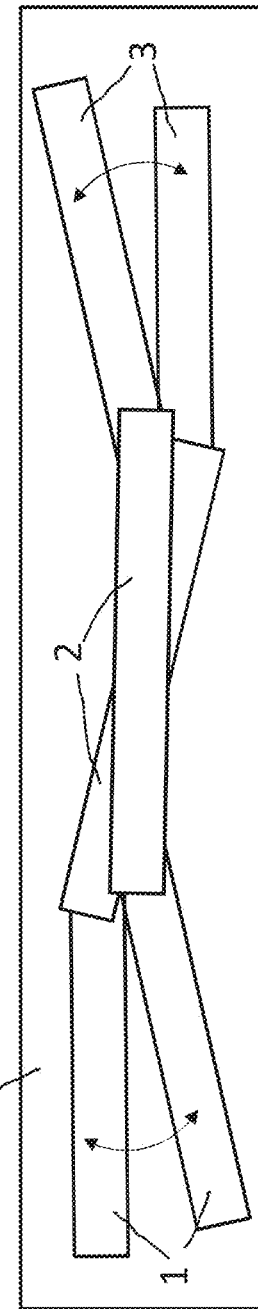
Fig. 5A
Fig. 5B

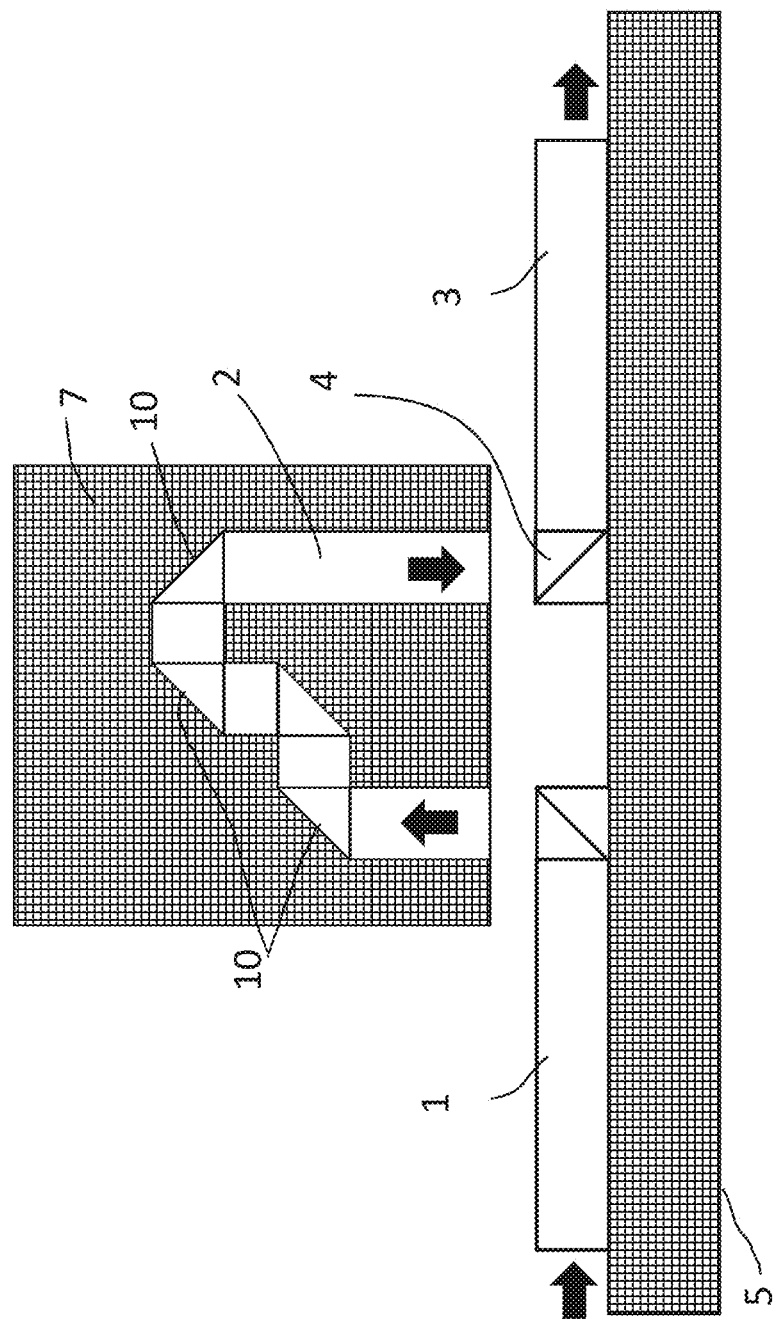

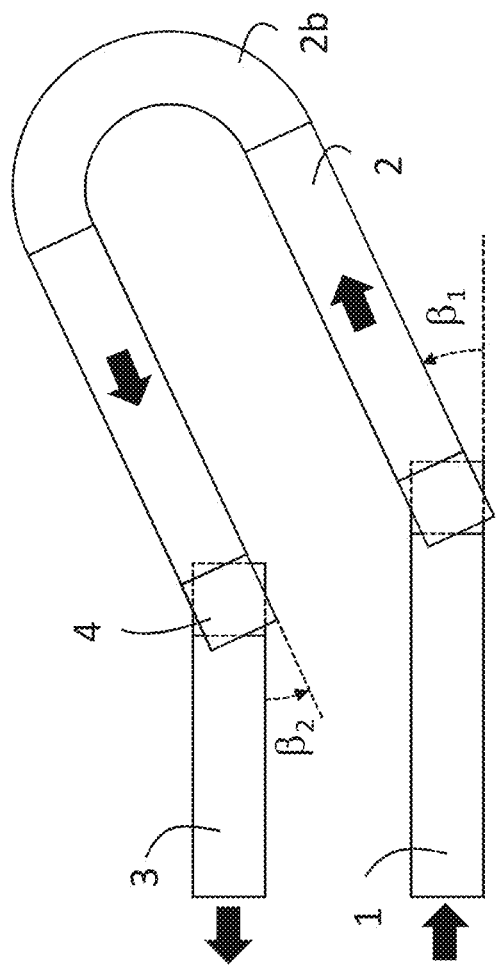
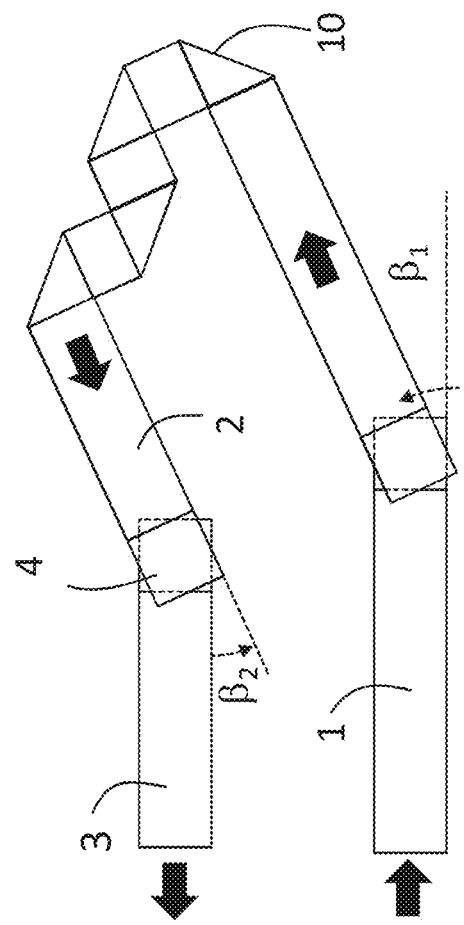
Fig. 7A
Fig. 7B

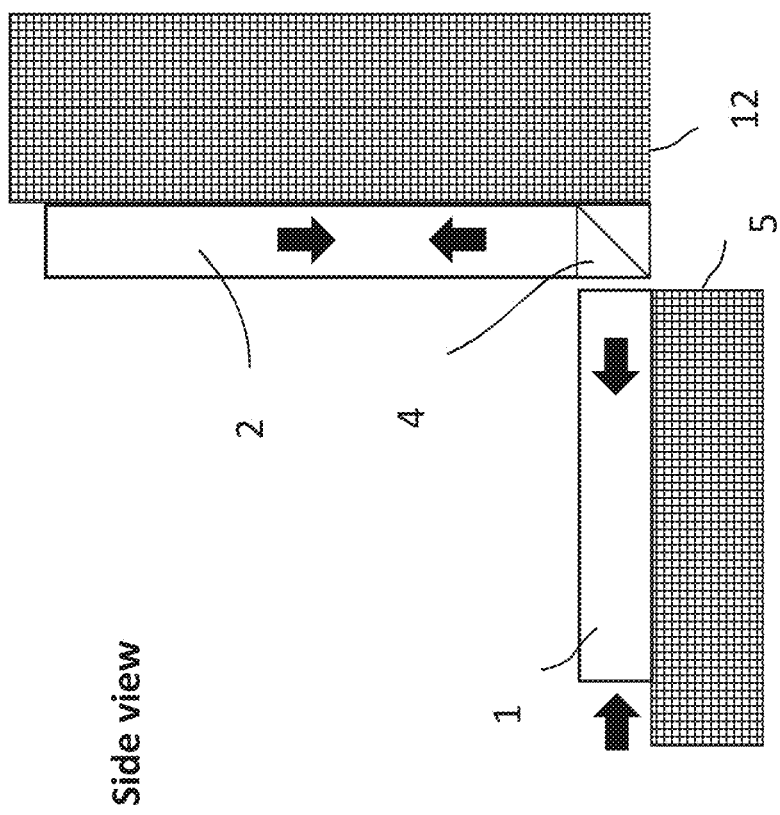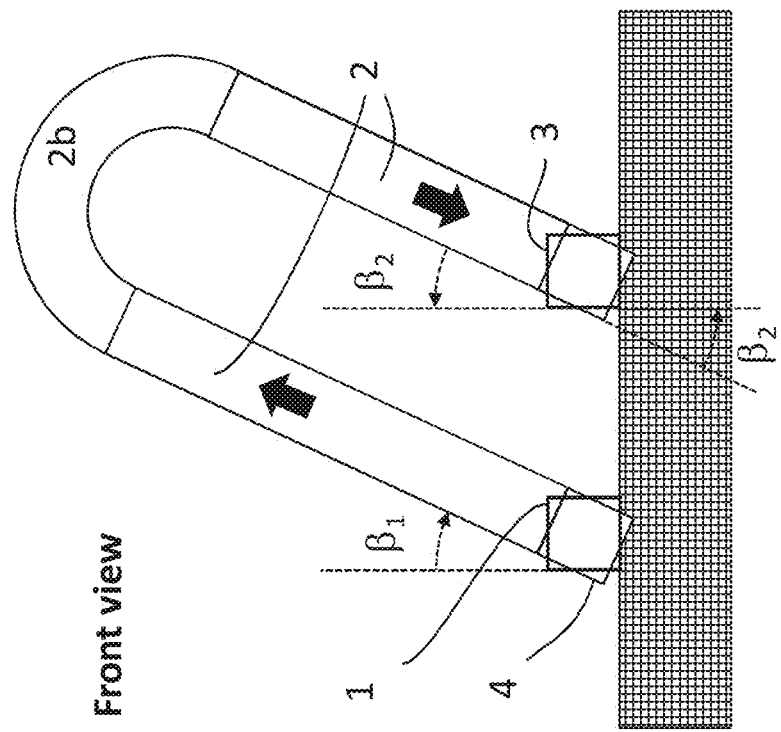
Fig. 8

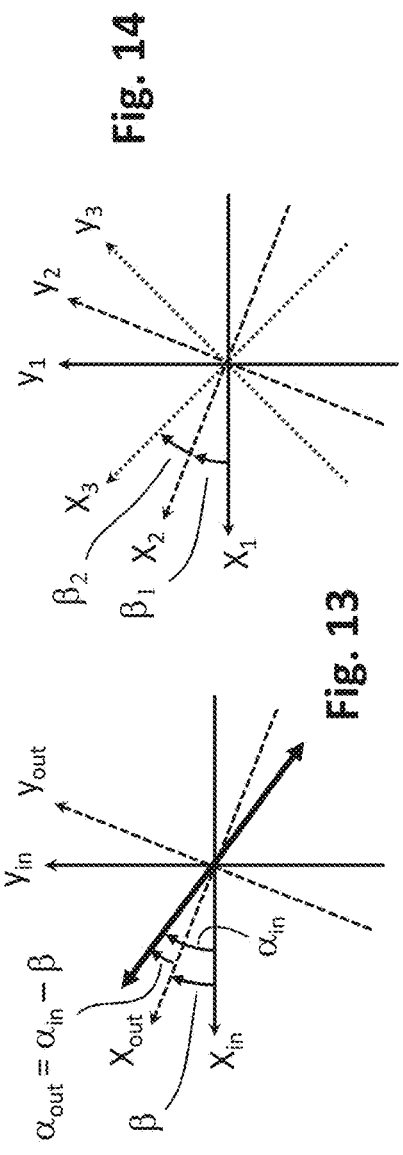
Fig. 12
Fig. 13
Fig. 14
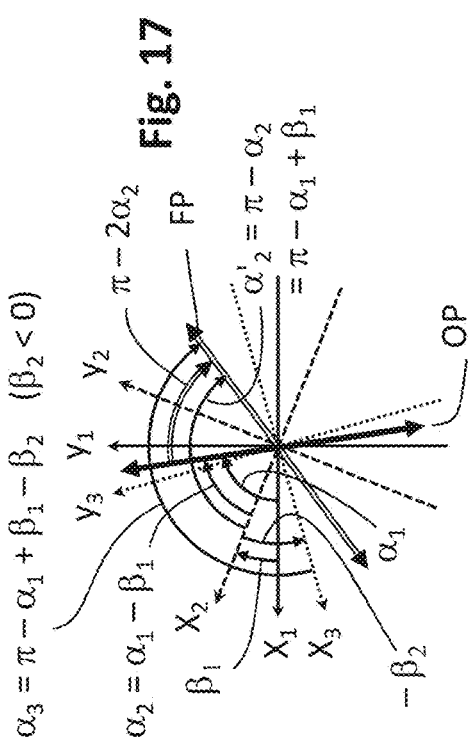
Fig. 15
Fig. 16
Fig. 17

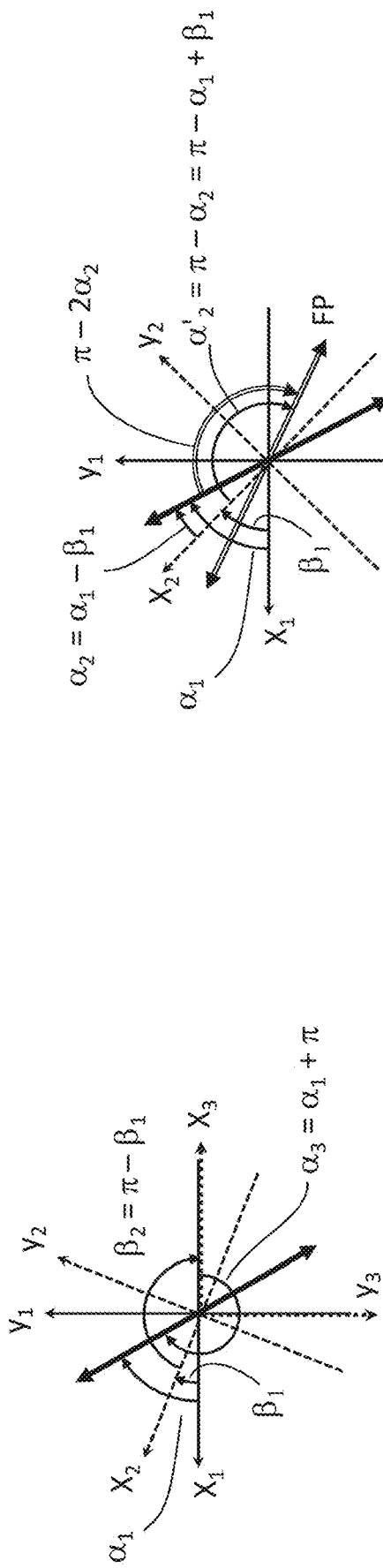
Fig. 18
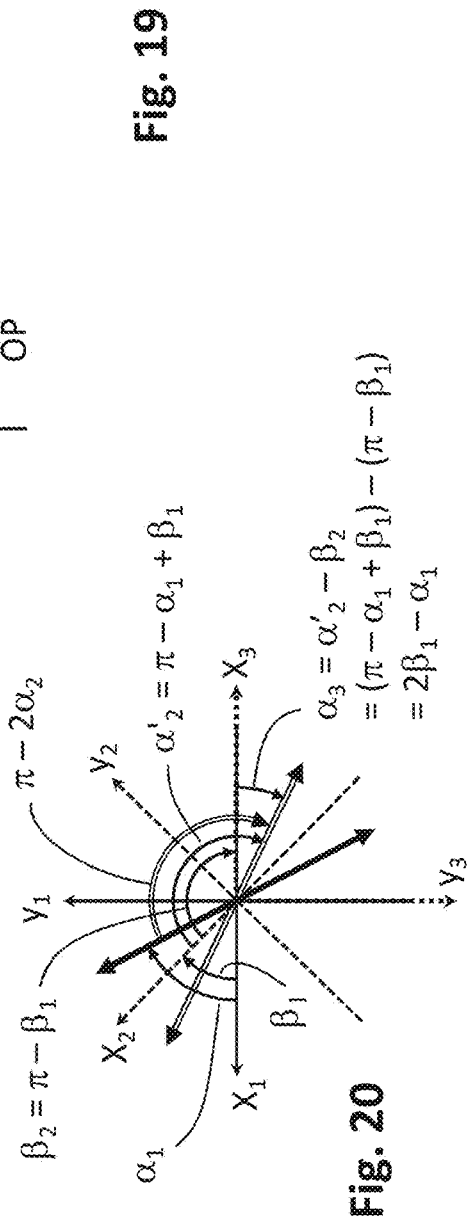
Fig. 19
Fig. 20

POLARIZATION ROTATORS

FIELD OF THE INVENTION

The present invention relates to optical components, such as photonic integrated circuits and systems using polarization rotators.

BACKGROUND OF THE INVENTION

The present invention relates to polarization rotators, more particularly to polarization rotators for photonic integrated circuits (PIC), i.e. for planar waveguide circuits. Waveguides that form a photonic integrated circuit are typically formed on the surface of a chip, such as a silicon chip. In such planar waveguides light propagates along the surface of the chip in the direction of the local z-axis.

Polarization rotators are optical devices that rotate the polarization axis of a linearly polarized light beam by an angle of choice, and they are key components in optical isolators, polarization splitter-rotators and circulators. Although the rotation of linear polarization is a main subject of this disclosure, the same or similar concepts can also be applied for circular or elliptical polarization.

In free space optics, these polarization rotation devices can be based on the Faraday effect, on birefringence, or on reflection. A Faraday rotator requires a waveguide material that has a magneto-optic effect. In birefringent polarization rotators linearly polarized light is decomposed into two components and phase difference between those components occurs due to birefringence and changes the polarization. Birefringence can be a material property and, in case of waveguides, it is typically induced by waveguide geometry, stress in waveguide materials, or both. Light going through one or multiple reflections may also experience phase shifts between polarization components and it can, therefore, also have its polarization rotated.

Integrated polarization manipulators are often based on the use of some type of birefringent waveplates, that are made of either asymmetric waveguide sections or separate wave-plates made of birefringent material and inserted into slots etched across a waveguide. Waveplate-based polarization rotators are typically based on the interference between the polarization modes, which makes them wavelength dependent and not suitable for very broadband applications.

In waveguide circuits, cross-polarization coupling or modal evolution has also been proposed. Modal evolution based rotators work on the principle of adiabatically modifying the cross-section of a waveguide so that the orientations of the polarization eigenmodes are gradually rotated by the required amount. The transition needs to be adiabatic so that power coupling between different modes does not occur, making the devices very long and difficult to fabricate with conventional waveguide processes. It is also difficult to achieve non-orthogonal polarization rotation with these types of polarization rotators, i.e. other than 90° rotation.

The optical power of light may be divided into two polarization eigenmodes, each of which propagating along a waveguide with its characteristic velocity. The polarization modes in a planar waveguide can often be approximated as pure TE and TM modes, where the electric field is oriented along the surface of the waveguide chip (TE, x-axis) or along the normal of the waveguide chip (TM, y-axis) when light propagates along the optical axis of the waveguide, i.e. the local z-axis. The velocities are defined by the effective refractive indices ($n_{eff}$) of the modes. In a birefringent waveguide, the two polarization modes have different $n_{eff}$.

The phase difference between the two modes, and therefore also the polarization of light, will thus vary along the waveguide. The total electric field of light can be thus considered to consist of two components; one ($E_x$) directed along the x-axis and one ($E_y$) directed along the y-axis. This approximation is used to explain the invention, although the invention is not limited to the use of pure TE and TM modes.

Polarization in a micron-scale silicon-on-insulator (SOI) waveguide is difficult to rotate to other angles than in multiples of 90 degrees. Presently in SOI waveguides, a 45 degree polarization rotation would be required to realize a fully integrated optical isolator based on Faraday rotation.

Known integrated polarization rotators are quite sensitive to fabrication errors and to process variations, as both the orientation of the polarization eigenmodes and the amount of birefringence needs to be accurately controlled. This limits their application in commercial devices. Some technologies, like those using inserted thin wave-plates into etched slots, are very demanding from an assembly point of view. Many known approaches, especially those relying on interference effects between waveguide modes, are also intrinsically wavelength dependent.

OBJECT OF THE INVENTION

It is an object of the present invention to achieve polarization rotation for any desired rotation angle and for a broad wavelength range by using one or more planar waveguide chips. This objective results from the needs that have appeared when developing waveguide chips using the micron-scale SOI platform. The solutions presented below can, however, be applied to many other planar waveguide platforms.

An important advantage of the invention is that it allows polarization rotation to any direction, and it supports simultaneous realization of polarization rotation for multiple waveguides on a single waveguide chip, without the need to assemble the necessary parts separately for each waveguide.

SUMMARY OF THE INVENTION

According to the invention, a polarization rotator is provided, comprising:
  a first waveguide layer containing at least a first waveguide, said first waveguide having an input end and an output end,
  a second waveguide layer having at least a second waveguide, said second waveguide having an input end and an output end, and
  at least a first vertical mirror element arranged at the end of at least one of said waveguides to couple light between the output end of the first waveguide and the input end of the second waveguide.

The optical axis of the first or second waveguide having the vertical mirror element at its end, may according to the invention be rotated in its waveguide layer at a first angle in order to induce rotation of polarization of light coupled between the first and second waveguides with an amount that corresponds to said first angle.

The first waveguide layer may have at least a third waveguide with input end and an output end and at least a second vertical mirror element arranged at the end of at least one of the said second and third waveguides to couple light between the output end of the second waveguide and the input end of the third waveguide. The optical axis of the waveguide that has the second vertical mirror element may according to the invention be rotated in its waveguide layer at a second angle in order to induce rotation of polarization of light coupled from said second waveguide to said third waveguide with an amount that corresponds to said second angle.

In some embodiments, the second waveguide layer is perpendicular to the first waveguide layer, whereby the optical axis of said first waveguide is rotated in the first waveguide layer at the said first angle, and whereby the said first vertical mirror element is coupled to the output end of said first waveguide to couple light from the output end of the first waveguide to the input end of the second waveguide and said second vertical mirror element is coupled to the input end of said third waveguide to couple light from the output end of the second waveguide to the input end of the third waveguide, and whereby the optical axis of said third waveguide may according to the invention be rotated in the first waveguide layer at the said second angle in order to induce rotation of polarization of light.

In further embodiments, the second waveguide layer is perpendicular to the first waveguide layer, whereby the optical axis in the input end of said second waveguide is rotated in the second waveguide layer at the said first angle, and whereby the said first vertical mirror element is coupled to the input end of said second waveguide to couple light from the output end of the first waveguide to the input end of the second waveguide, and said second vertical mirror element is coupled to the output end of said second waveguide to couple light from the output end of the second waveguide to the input end of the third waveguide, and whereby the optical axis in the output end of said second waveguide is rotated in the second waveguide layer at the said second angle in order to induce further rotation of polarization of light.

In some embodiments, the second waveguide layer is above or below the said first waveguide layer and said second and first waveguide layers are parallel to each other, whereby said first vertical mirror element is coupled to the output end of said first waveguide and a third vertical mirror element is coupled to the input end of said second waveguide, in order to couple light from the first waveguide to the second waveguide. In some embodiments, the first waveguide layer may have at least a third waveguide deposited thereon, said third waveguide having an input end and an output end, whereby said second vertical mirror element is coupled to the input end of said third waveguide and a fourth vertical mirror element is coupled to the output end of said second waveguide, in order to couple light from the second waveguide to the third waveguide.

In some embodiments, where the second waveguide is a straight waveguide having the third vertical mirror element coupled to its input end in order to couple light from said first waveguide to the second waveguide, and said fourth vertical mirror element coupled to its output end in order to couple light from the second waveguide to said third waveguide.

In some embodiments the second waveguide may include horizontal light turning elements, such as bends or horizontal TIR mirrors that turn the light horizontally in the second waveguide layer to allow coupling of light from the output of said first waveguide to the input of said third waveguide. The horizontal light turning elements may adjust or compensate polarization dependent phase shifts in the polarization rotator.

According to further embodiments, the inventive polarization rotator may include one or several of the following features:

the third waveguide is oriented in the same direction as said first waveguide on said first substrate.
the third waveguide is oriented in the opposite direction as said first waveguide on said first substrate.
the second waveguide comprises straight and parallel input and output portions and horizontal light turning elements, such as bends or horizontal TIR mirrors, to couple said input and output portions together.
the straight waveguide sections and/or said horizontal light turning elements are selected to have polarization dependent phase shifts that compensate or supplement polarization dependent phase shifts that are induced by said vertical mirror elements, thus allowing for rotation of linear input polarization into linear output polarization.
the second waveguide and any mirror elements in the second waveguide layer are manufactured by additive manufacturing, such as 3D printing or direct writing.

BRIEF DESCRIPTION OF THE DRAWINGS

FIG. 2 shows how to achieve polarization rotation between two straight waveguides according to an embodiment of the invention;

FIG. 3 shows how to achieve polarization rotation between three straight waveguides according to an embodiment of the invention;

FIGS. 4A and 4B show examples of mirror elements employed in at least some embodiments of the invention;

FIGS. 5A and 5B shows schematic side and top view illustrations of an inventive polarization rotator;

FIG. 6 shows a schematic side view illustration of a further embodiment of an inventive photonic integrated circuit;

FIGS. 7A, 7B, 7C and 7D show how to achieve polarization rotation between two parallel waveguides using a U-loop waveguide between them according to further embodiments of the invention;

FIG. 8 shows front and side views of a further exemplary inventive photonic integrated circuit;

FIG. 12 shows basic principles of coordinate system rotation between two waveguides;

FIG. 13 shows linear polarization rotation caused by one coordinate system rotation between two waveguides;

FIG. 14 shows basic principles of coordinate system rotation between three waveguides;

FIG. 15 shows linear polarization rotation caused by two coordinate system rotations between three waveguides;

FIG. 16 shows basic principles of opposite coordinate system rotation between two waveguides;

FIG. 17 shows linear polarization rotation caused by two opposite coordinate system rotations between three waveguides and one polarization reflection in the second waveguide;

FIG. 18 shows linear polarization rotation caused by two supplementary coordinate system rotations between three waveguides;

FIG. 19 illustrates linear polarization rotation in the case of one coordinate system rotation between two waveguides and one polarization reflection in the second waveguide; and FIG. 20 shows linear polarization rotation in the case of two coordinate system rotations and one polarization reflection in the second waveguide.

DETAILED DESCRIPTION OF EMBODIMENTS

Polarization rotation occurs naturally when light propagates from one waveguide to another (or from one birefringent material into another), and the polarization eigenmodes (or fast and slow axis directions) in the two propagation media are oriented differently. In planar optical waveguides it is quite difficult to rotate the eigenmodes with respect to the substrate of the waveguide.

Rotation of the eigenmodes of a waveguide with respect to the substrate of that same waveguide is, however, a common approach to implement polarization rotators on a planar waveguide circuit. Gradual introduction of asymmetry in the waveguide gradually rotates the polarization eigenmodes while birefringence in the asymmetric waveguide reflects the polarization with respect to one of the polarization eigenmode directions. This corresponds to the use of waveplates in free space optics. Other examples of asymmetric waveguides with tilted eigenmodes are periodic gratings of asymmetric waveguide cross-sections alternating along the device, or waveguides with a gradually varying shape.

Figure 1:
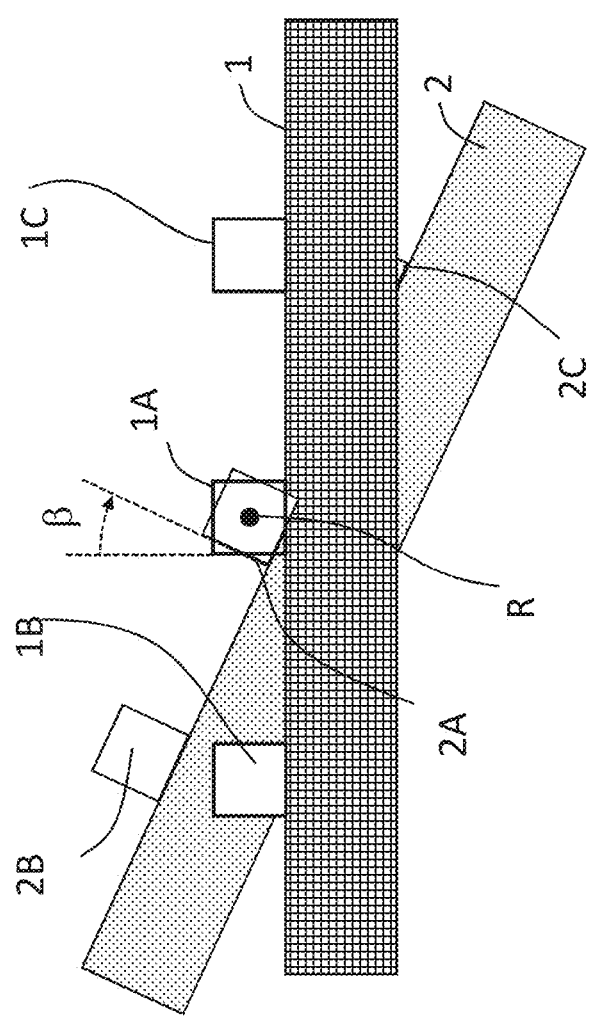
FIG. 1 shows a concept for rotating one waveguide with respect to another waveguide around their common optical axis, which doesn't support simultaneous rotation between multiple waveguide pairs.

FIG. 1 illustrates how rotation of one waveguide chip 2 with respect to another waveguide chip 1 around the common optical axis of that waveguide pair allows for polarization rotation for that one waveguide pair, but not for any other waveguide pairs on the same two waveguide chips. In FIG. 1, two waveguide chips 1, 2 are rotated an angle β around a rotation axis R that is defined as the common optical axis of the primary waveguides 1A and 2A on the two chips. The other waveguides 1B, 2B, 1C, 2C on chips 1, 2 are not aligned after the rotation.

The invention is based on the idea that by turning light up or down from an input waveguide, it becomes possible to rotate polarization into any direction by rotating an output waveguide, which is on a different waveguide chip or layer as the input waveguide. This can be done in any direction. This is demonstrated in FIG. 2, which schematically illustrates top and side views of a polarization rotating element with two waveguides 1 and 2. The waveguides are optically coupled to each other with vertical mirror elements 4. The mirrors 4 couple incoming light as shown by the bold arrows between the two waveguides 1, 2, by reflecting light upwards to the waveguide 2. The direction of light may naturally also be reversed. Polarization rotation occurs between the two waveguides when they are physically rotated by any angle β with respect to each other, while light is coupled up from input waveguide 1 to output waveguide 2.

In FIG. 2, showing the fundamental concept of the invention, the polarization is rotated between two straight waveguides 1 and 2 by rotating with an angle β the output waveguide 2 with respect to the input waveguide 1 around a vertical optical axis between the two waveguides. Light is coupled between the two waveguides by the mirror elements 4, while polarization is rotated between the mirrors when light propagates vertically.

More specifically, the waveguides 1 and 2 are in two separate waveguide layers that have been positioned on top of each other. A waveguide layer contains a photonic integrated circuit or at least two separate waveguides on a common substrate and in the same plane. The waveguide layers of waveguides 1 and 2 may be deposited on two separate substrates, so that they are on two separate waveguide chips that are positioned on top of each other and in parallel to each other (see e.g. FIG. 3). Alternatively, the two separate waveguide layers of waveguides 1 and 2 may be deposited on a common substrate, so that they are two waveguide layers on a single waveguide chip. The first or input waveguide 1 has an input end where the light is entering as shown by the bold arrow, and an output end at its mirror element 4, as best seen in the side view figure. The reverse applies to the second or output waveguide 2. A first mirror element 4 is coupled to the output end of the first or input waveguide 1 and a second mirror element is coupled to the input end of the second waveguide 2. The waveguide layers of the first and second waveguides are aligned so that the first mirror element couples light to the second mirror element.

As shown, the second waveguide and its optical axis are rotated at an angle β with respect to the optical axis of the first waveguide, in order to induce rotation of polarization of light coupled from the first waveguide to said second waveguide with an amount that corresponds to the first angle β. In this example, polarization rotation occurs when light travels vertically between the two waveguide layers and the optical axes of the two waveguides can be rotated with respect to each other in the small gap between the two vertical mirrors.

According to an important aspect of the invention, it allows integration of a number of input and output waveguides in the two parallel waveguide layers, while simultaneously coupling light from all the input waveguides to all the output waveguides. Preferably, the vertical mirror elements 4 reflect light up or down by 90°, in which case the rotation axis of the waveguides to be turned is normal to the plane of the waveguide layers.

In the following, a vertical mirror element is defined as a mirror reflecting light out of a waveguide layer, i.e. up or down with respect to the direction of light propagation in a waveguide before the reflection. A horizontal mirror is defined as a mirror reflecting light within its waveguide layer, i.e. left or right with respect to the direction of light propagation in a waveguide before the reflection.

Turning now to FIG. 3, which is a schematic illustration of a top and side view of a polarization rotating element with three waveguides that are optically coupled to each other with vertical mirror elements. In this embodiment of the invention, the polarization rotation is achieved as a combination of two polarization rotations between waveguides 1, 2 and 3, due to the turning angles $\beta_1$ and $\beta_2$, respectively. In this embodiment, two waveguides 1 and 3 are deposited on a first substrate 5 and they are part of the first waveguide layer. In the illustration of FIG. 3, waveguide 2 may be b deposited on a second substrate (not shown) and it is part of the second waveguide layer on a separate waveguide chip. However, the second waveguide layer with waveguide 2 can also be deposited above or below the first waveguide layer on the same substrate 5.

It is also possible to use additive manufacturing, ion beam etching or other 3D fabrication methods to realize the second waveguide layer in an inventive polarization rotator. For example, the waveguides and mirrors in the second waveguide layer may be formed by 3D printing or laser direct writing techniques. With these approaches it is possible to produce curved mirrors that avoid the need to add conventional straight waveguides between the two mirrors in the second waveguide layer. Another advantage of additive manufacturing, ion beam etching and other 3D fabrication methods is that different waveguides and mirrors in the second waveguide layer can have different orientations, unlike wet-etched mirrors that are typically aligned with the common crystal orientation of the material. The option of using mirrors produced by additive manufacturing, ion beam etching or other 3D fabrication methods is can be used in the second waveguide layer in all the embodiments of the invention.

A first mirror element 4 is coupled to the output end of the first waveguide 1, and a second mirror element 4 is coupled to the input end of the second waveguide 2. Further, a third mirror element 4 is coupled to the output end of the second waveguide 2 and a fourth mirror element 4 is coupled to the input end of the third waveguide 3. The first and second waveguide layers are aligned so that the first mirror element couples light to the second mirror element and the third mirror element couples light to the fourth mirror element. The optical axis of the second waveguide 2 is rotated at an angle $\beta_1$ with respect to the optical axis of the first waveguide 1 when light couples from the first to the second vertical mirror. In this example, the second waveguide layer is on top of the first waveguide layer and the two waveguide layers are parallel to each other.

In the embodiment of FIG. 3, the two polarization rotations take place in the same clockwise direction when viewed along the light propagation direction, i.e. when light travels up in the first rotation and down in the second rotation. In the top-view the positive rotations of angles $\beta_1$ and $\beta_2$ appear to be in opposite directions.

In the embodiments of FIG. 3, no waveguide bends or horizontal mirrors are necessary. From an assembly point of view, however, the mirror elements need to be manufactured (etched) precisely, as the coupling of light at the mirror elements is sensitive to etching errors. This is discussed in detail later.

There are multiple options to implement the mirror elements employed by the invention, see FIG. 4A and FIG. 4B. For example, it can be based on total internal reflection (TIR) mirrors, as shown in FIG. 4A or external metallic mirrors as shown in FIG. 4B.

FIGS. 4A and 4B offers schematic 3D illustrations of the vertical mirror elements used in the invention.

In the example of FIG. 4A, the mirror surface 41 reflects light up (or down) from the waveguide layer of the waveguide 40, and may comprise of a TIR mirror surface 41 with a negative angle and with an output facet 42. It is also possible to have metal coating or other reflecting coating on the mirror surface 41. The output facet can be anti-reflection coated to reduce unwanted reflections.

In the example of FIG. 4B, the mirror element 43 may consist of a vertical transparent waveguide facet 45 at the end of the waveguide 43, followed by an external (as indicated by dotted lines D) metallic mirror surface 44. The vertical facet 45 can be anti-reflection coated to reduce unwanted reflections. The mirror surface 44 can also have some non-metallic reflecting coating. Obviously, the same techniques from FIG. 4A and FIG. 4B may be used to produce horizontal mirror elements, or to reflect light down instead of up.

A tilted mirror surface according to FIG. 4A or FIG. 4B can be fabricated by using anisotropic dry etching in a tilted angle, for example with an ion beam etcher, or by using anisotropic wet-etching that produces flat surfaces along certain crystal planes. For SOI waveguides, potassium hydroxide (KOH) or tetramethylammonium hydroxide (TMAH) are commonly used wet-etching methods. Exactly 45° mirrors can be produced either by adding suitable surfactants to etch chemicals or by using a special crystal orientation on the wafer. With the most common crystal orientation [100], mirrors on silicon with an angle of 55° are most easily produced, and in some embodiments of the invention such mirrors may be used. However, a mirror angle of 45° reflects light perpendicularly up or down, which is the preferred option in this invention.

Any of the mirrors can also be fabricated using additive manufacturing or ion beam etching, as explained above. With either of these processes it is possible to have different mirror orientations in the same waveguide layer, which allows realizing different polarization rotations in the same waveguide layer or chip.

One practical challenge for the designs illustrated in FIG. 3 (and FIGS. 5-6) is that in some cases, the positions of the vertical mirror elements cannot be precisely controlled. For example, wet etched 45° mirrors typically have some variation in the width of the etched areas. Then the exact distance between any two mirror elements that are in different angles, for example facing each other as in FIG. 3, varies over the wafer or from wafer to wafer. This causes misalignment between the optical axes of the waveguides. For example, if fabrication imperfections cause all the mirrors in FIG. 3 to move closer to their respective waveguides then the first and fourth mirror in waveguide layer 1 move further away from each other while the second and third mirror in waveguide layer 2 move closer to each other. This makes it impossible to perfectly align both mirror pairs by aligning the waveguide layers to each other. Some embodiments of the invention can avoid this potential challenge if they are based on using identical mirrors (in exactly the same orientation) in each waveguide layer (see FIGS. 7 and 8).

When determining the polarization rotation of an inventive waveguide as a whole, the phase shifts that are introduced to the s and p-polarization by mirrors and especially TIR mirrors must be taken into account. For dielectric mirrors these phase shifts can be calculated using Fresnel equations, where s- and p-polarization refer to polarization states that have perpendicular electric and magnetic fields at the plane of incidence. For an up-reflecting TIR mirror, the s-polarization corresponds to the TE mode of the waveguide, and the electric field is in the plane of the waveguide layer and oriented along the x-axis of the waveguide's local coordinate system. Correspondingly, the p-polarization corresponds to the TM mode of the waveguide, and the electric field is perpendicular to the plane of the waveguide layer and oriented along the y-axis of the waveguide's local coordinate system. In some embodiments of the invention, the polarization dependent phase shifts in the vertical mirror elements may be minimized by using metallic mirrors, for example.

Polarization dependent phase shifts can also occur in horizontal mirrors, waveguide bends and even in straight waveguides. If the effective indices of the TE and TM modes are different then those modes propagate with different velocities and accumulate a phase shift between them as a function of propagation distance. This also opens up the possibility to create a desired polarization dependent phase shift in one part of the polarization rotator to compensate for an unwanted phase shift in another part of the same device.

In an ideal case, the polarization dependent phase shift of each part of the polarization rotator would be zero or a multiple of $\pi$, and any linearly polarized input light would then remain linearly polarized when propagating though the polarization rotator. Polarization dependent phase shifts, that are not integer multiples of $\pi$, normally convert linear polarization into elliptical polarization. For simplicity, linear polarization is assumed in the following, since a detailed analysis of polarization rotation for elliptical polarization is very complicated and difficult to illustrate.

Polarization dependent phase shifts in TIR mirrors are a function of at least the angle of incidence ($\alpha$) of light, the waveguide material (silicon) and the cladding material (for example air, silicon dioxide or silicon nitride).

There are several solutions for a case where the polarization dependent phase shift $\Delta\phi$ in a vertical mirror element is not zero. For example, one may use next to the vertical mirror element one or more compensating optical elements with a non-zero polarization dependent phase shift of $-\Delta\phi$. For example, a birefringent waveguide section or a horizontal TIR mirror can be integrated to the same waveguide where the vertical mirror element is integrated. This approach applies to any linear input polarization. A person skilled in the art can calculate the impact of polarization dependent phase shifts on polarization in any of the polarization structures described here and to design a polarization rotator so that any unwanted polarization dependent phase shift is compensated with another similar phase shift to keep the light linearly polarized when needed. One example of this is to add one horizontal TIR mirror next to each vertical TIR mirror element, so that they compensate each other's polarization dependent phase shifts (see e.g. FIG. 7C).

Referring again to FIG. 3, there is shown a total of four vertical mirror elements 4, i.e. one at the end of each waveguide 1, 2, 3 at the two polarization rotation interfaces. However, some of these vertical mirror elements can be replaced by a U-turn in the second waveguide layer if that second waveguide layer is turned into upright position with respect to the first waveguide layer.

FIG. 5A is a schematic side-view illustration of an inventive polarization rotator with the two waveguide layers being on two substrates (or waveguide chips) 5 and 7 that are orthogonal to each other. Three waveguides 1, 2 and 3 are optically coupled to each other, like in FIG. 3, but only two vertical mirror elements 4 are needed in this case. In this embodiment, the second waveguide 2 comprises a straight input portion 2a and a straight output portion 2c and an intermediate bent waveguide portion 2b connecting said input and output portions together.

More specifically, the middle waveguide 2b makes a horizontal U-bend in the second waveguide layer to turn the upward propagating light down towards waveguide 3. U-loops based on waveguide bends typically cause polarization dependent phase shifts, which needs to be taken into account in designing the polarization rotator. Depositing the waveguide 2 directly on the same (first) substrate 5 with the waveguides 1 and 3 would be very difficult, so the preferred approach to realize the structure shown in FIG. 5A is to assemble two separate waveguide chips together.

FIG. 5A also illustrates the possibility for having passive mechanical alignment studs 8 and mating receptacles 8a between the two waveguide layers, which is a particularly useful in embodiments where the substrates (or waveguide chips) 5, 7 are perpendicular to each other. This mechanical alignment concept can be, however, applied to any polarization rotator that uses two separate waveguide chips.

FIG. 5B shows a top view of the embodiment of FIG. 5A, illustrating the various placement options of the waveguides 1 and 3 on the substrate 5, as shown by the double arrows. The position of the substrate (or waveguide chip) 7 then need to be adjusted accordingly, of course. The waveguides 1 and 3 in FIG. 5A may be considered to be tilted out to the viewing plane, but only the projection in FIG. 5B reveals this. In the two examples shown here, the waveguides 1 and 3 are parallel to each other, but this is not required.

In FIG. 6 is shown a further embodiment, using four horizontal TIR mirrors 10 in waveguide 2 that is part of the waveguide layer 2 on substrate (or waveguide chip) 7. Here the second waveguide 2 comprises a straight input portion and a straight output portion, and an intermediate waveguide portion that further comprises of TIR mirrors 10 and straight waveguide sections connecting those mirrors. The intermediate waveguide portion effectively forms an equivalent of an U-loop for connecting said input and output portions together.

Here, the mirrors 10 turn the light horizontally in the waveguide 2. To alleviate the problem of having polarization phase shifts caused by the TIR mirrors, a suitable number of mirrors 10 with suitable mirror angles may be used to effectively form a U-loop while producing an approximately $2\pi$ phase shift between the TE and TM polarizations. Thus, the horizontal TIR mirrors do not effectively change the polarization state. The number of mirrors (four) and their angles (90°) in FIG. 6 (and FIG. 7B) is only chosen for schematic illustration and these can be optimized to achieve any desired phase shift between the two polarization modes in waveguide 2. One example of such optimization is the realization of 7C phase shift between the TE and TM polarizations to make a U-loop that reflects linear polarization with respect to the polarization axes of the waveguide.

Obviously any number of mirrors having any reflecting angles may be used, as long as the waveguide 2 can be optically coupled to waveguides 1 and 3. Regarding the placement of the waveguides on the substrates (or waveguide chips) 5 and 7, see FIG. 5B. One common advantage of the embodiments shown in FIGS. 5 and 6 is the ability to reduce the number of vertical mirror elements.

The choice between horizontal bends, horizontal mirrors and vertical mirror elements can be influenced by their optical losses and polarization dependent phase shifts. As was explained earlier, TIR mirrors typically have finite phase shifts $\Delta\phi$, but also straight waveguides and waveguide bends can produce finite $\Delta\phi$. Sometimes a finite $\Delta\phi$ can be used in the straight waveguides, bends or horizontal mirrors to compensate for the finite $\Delta\phi$ in the vertical mirror elements or to reflect linear polarization with respect to one of the polarization axes.

In one embodiment of the present invention, a number of bends or TIR mirrors may be used to produce a $\pi$ phase shift between the two polarization modes in the second waveguide to reflect the polarization with respect to one of the polarization eigenstates. In some other embodiments, a number of bends or TIR mirrors may be used to produce a $2\pi$ a phase shift between the two polarization modes in the second waveguide to avoid the net effect of a $\Delta\phi$ that cannot be reduced to zero. This is schematically illustrated in FIG. 6 with four TIR mirrors 10, but the number and angle of horizontal mirrors (or bends) should be optimized for the used waveguide, mirror and bends structures.

To reduce any misalignment between the optical axes of the waveguides one may, according to some embodiments of the present invention, arrange all the mirrors in the same waveguide layer (or waveguide chip) to have the same orientation, so that the waveguides are antiparallel. This eases the alignment between the waveguide layers, especially when the positions of the vertical mirror elements have finite fabrication tolerances.

One such embodiment is illustrated in FIG. 7A, which is a schematic top-view illustration of a polarization rotator with three waveguides 1, 2 and 3 that are optically coupled to each other with vertical mirror elements 4 in all three waveguides (four mirrors in total). In this embodiment, the two polarization rotations take place in the same direction and waveguide 2 includes a horizontal U-loop bend 2b. The waveguides 1 and 3 are antiparallel (180°) if the angles $\beta_1=\beta_2$ and if the U-loop makes a 180° turn.

Again, it is important to pay attention to the polarization dependent phase shift that typically occurs when a waveguide makes a U-turn. One approach is to intentionally increase the finite phase shift $\Delta\phi$ up to $2\pi$ (i.e. 360°), or to a multiple of that, so that effectively waveguide 2 and its vertical mirror elements don't cause any polarization dependent phase shift.

Figure 7C:
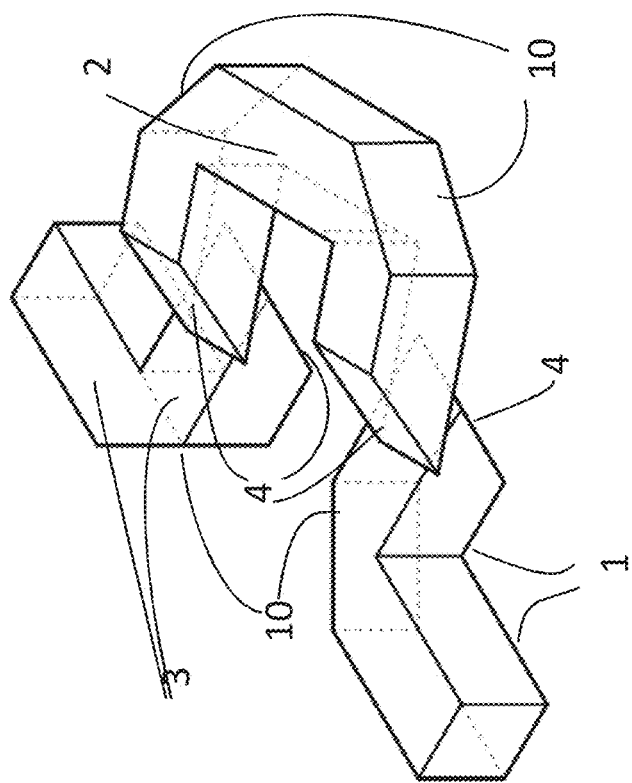
Figure 7D:
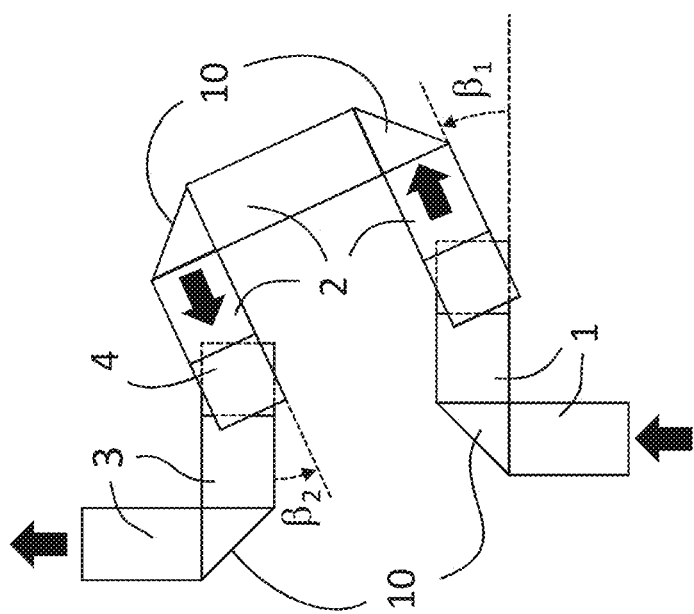

FIG. 7B is a schematic top-view illustration of a polarization rotator with three waveguides that are optically coupled to each other with vertical mirror elements 4 in all three waveguides 1, 2, 3. In this example, the two polarization rotations take place in the same direction and the waveguide 2 has two straight waveguides connected with horizontal TIR mirrors 10 that turn the light to make waveguides 1 and 3 antiparallel. Four 90° mirrors 4 are used here only schematically to illustrate the idea of achieving $\beta_1=\beta_2$. If the TIR mirrors 10 produce an approximately 360° phase shift between the TE and TM polarizations, then they don't effectively change the polarization state in waveguide 2. Such horizontal TIR mirrors can also compensate for the unwanted phase shifts caused by the vertical mirror elements. For example, the polarization dependency of two vertical TIR mirrors 4 (90° turning angle) at the ends of waveguide 2 could be compensated by two horizontal TIR mirrors (90° turning angle) in waveguide 2. The same compensation could be applied to vertical TIR mirrors in waveguides 1 and 3 by adding horizontal TIR mirrors into waveguides 1 and 3. This is illustrated in FIGS. 7C and 7D.

It was earlier shown in the embodiment of FIG. 5A how the vertical mirror elements in the waveguide 2 could be eliminated by using a U-bend. In some embodiments, one may omit the mirror elements from waveguides 1 and 3 instead. This is illustrated in FIG. 8. In this case, the chip 12 of the waveguide 2 is turned into upright position, and all the vertical mirror elements 4 that are coupled to this waveguide chip are aligned and on the same chip. The substrate or chip 12 of the second waveguide 2 is placed to the edge of the substrate or chip 5 where the waveguides 1 and 3 are fabricated, or into a cavity etched into the substrate or chip 5. The two coordinate system rotations ($\beta_1$ and $\beta_2$) can be freely chosen, but according to one embodiment of the invention, the two mirrors 4 may have the same orientation, so that waveguide 2 makes again a U-loop 2b.

In this embodiment, the two polarization rotations take place in the same direction as waveguides 1 and 3 are antiparallel and waveguide 2 makes a horizontal bend 2b. The chip 12 of the waveguide 2 is rotated with respect to waveguides 1 and 2, which are on the same chip 5. The front view is along the light propagation direction in waveguide 1 and the side view is a side-view of waveguides 1 and 3 (waveguide 1 is behind waveguide 3).

In this configuration, the polarization rotation is $\beta_1+\beta_2$ if $\Delta\phi=0$. However, if the vertical mirror elements 4 or the waveguide 2 and its U-bend 2b cause any finite phase shifts $\Delta\phi$, then the preferred approach is to adjust the polarization dependent phase shifts of the individual elements so that their net effect is either zero or a multiple of $2\pi$, as was explained for FIGS. 7B, 7C and 7D, for example.

Advantages for these embodiments include a need for less up-reflecting mirrors and insensitivity to mirror etch.

Figure 9:
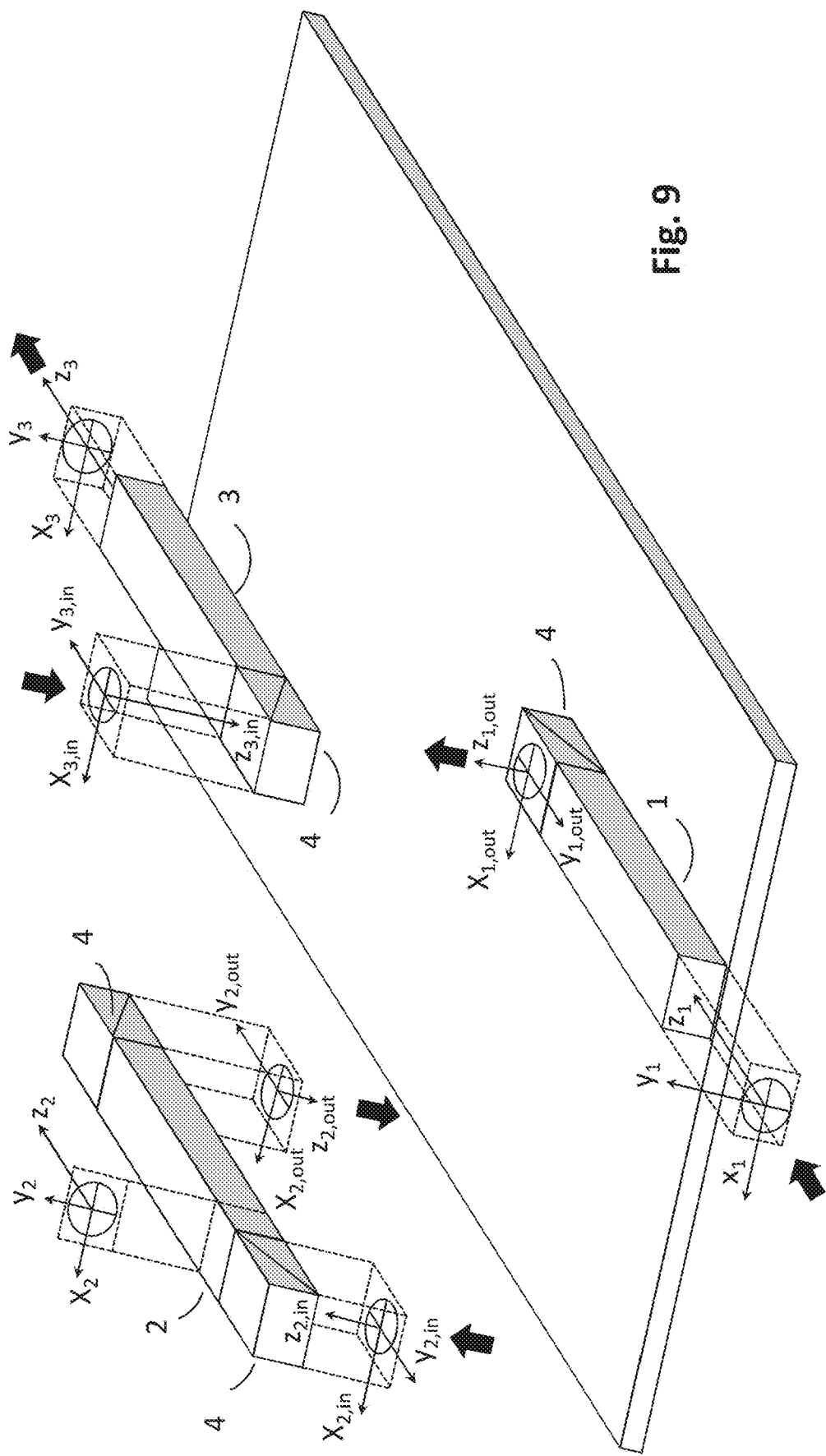
FIG. 9 line out the coordinate systems used in the various waveguides.

The local coordinate systems used in the various waveguides examples and in the vertical mirror elements are explained in FIG. 9. The bold arrows indicate the coupling of light between the waveguides, and the z-axes ($z_1$-$z_3$) indicate the primary direction of light propagation, i.e. the optical axes of the waveguides 1-3. The x and y axes indicate the primary electric field directions of the polarization eigenmodes in the waveguides and in their corresponding mirror elements. Waveguide 2 is moved away from its target location for visual clarity.

Figure 10:
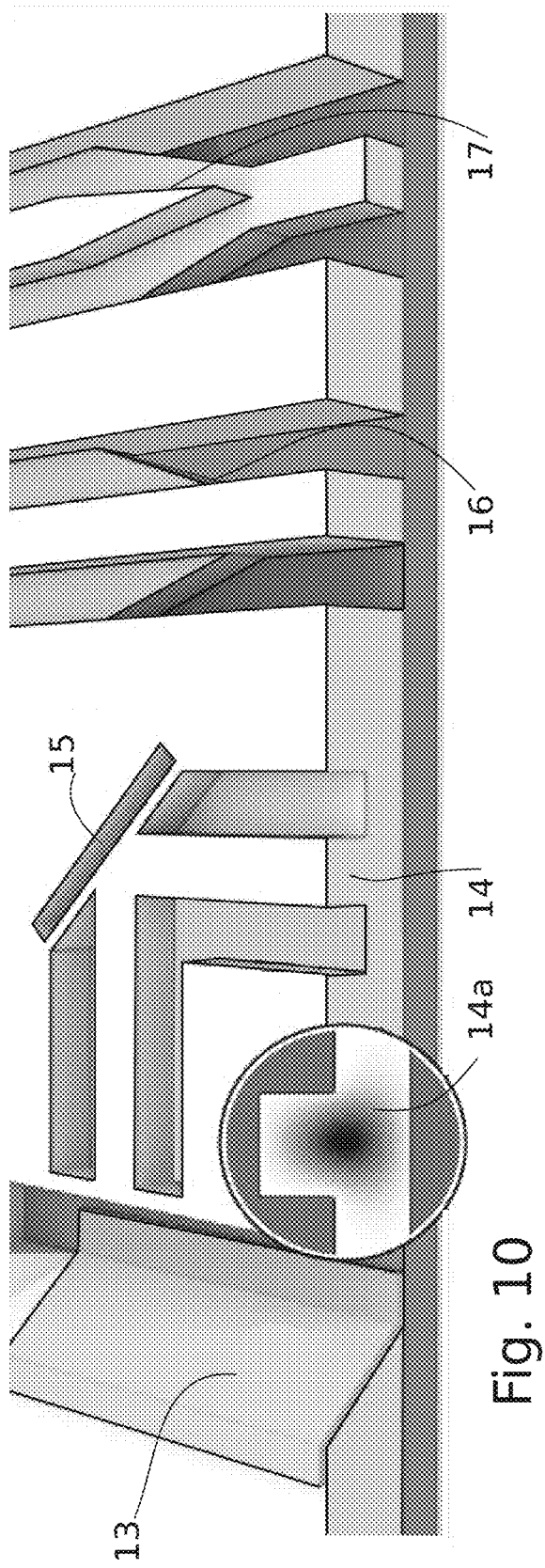
FIG. 10 shows some basic building blocks on a micronscale SOI platform.

FIG. 10 shows some basic building blocks on a micron-scale SOI platform. A metallized up-reflecting waveguide mirror 13; a single-mode rib waveguide 14 and its simulated mode field distribution 14a, a horizontal TIR mirror 15, a rib-strip converter 16 for adiabatic coupling between rib and strip waveguides, and a vertical taper 17 between two waveguide thicknesses are shown.

Figure 11:
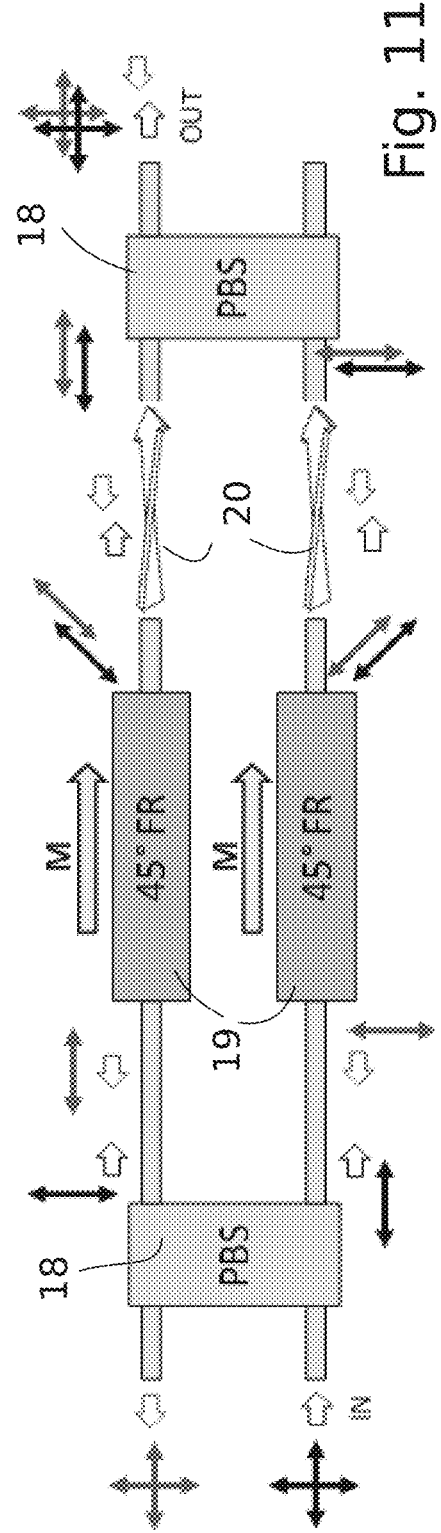
FIG. 11 shows a schematic view of one embodiment of an inventive integrated isolator.

FIG. 11 shows a schematic view of one embodiment of an inventive integrated isolator or circulator that consists of two polarization beam splitters (PBSs) 18, two 45° Faraday rotators (FRs) 19 and of two 45° (reciprocal) polarization rotators 20.

Various coordinate system rotations and the resulting polarization rotations are illustrated in FIGS. 12-20. All figures represent the coordinate axes, the (linear) polarization states and their rotations as viewed in cross-section and in the primary direction of light propagation. Light can naturally propagate also in the opposite direction as long as the system is reciprocal.

FIG. 12 shows the basic principle of coordinate system rotation ($\beta$) between an input and an output waveguide (for example, waveguides 1 and 2 in FIG. 2 or 9). If a vertical mirror element is integrated into the end of a waveguide, the rotation occurs with respect to the coordinate system of the mirror element.

FIG. 13 shows an example of linear polarization and its direction ($\alpha$) in both the original coordinate system ($x_{in}, y_{in}$) and in the new coordinate system ($x_{out}, y_{out}$) after coordinate system rotation ($\beta$). Polarization eigenmodes are typically aligned along the x- and y-axes of the waveguides. The polarization angle is $\alpha_{in}$ in the coordinate system of the first (input) waveguide, and $\alpha_{out}$ in the coordinate system of the second (output) waveguide.

Successive coordinate system rotations ($\beta_1+\beta_2$) between waveguides 1, 2 and 3 to the same direction are shown in FIG. 14. Indices 1, 2, and 3 refer to waveguides 1, 2 and 3. The resulting rotation of the polarization angle is illustrated in FIG. 15, where linear polarization after two successive coordinate system rotations $\beta_1+\beta_2$ is shown, and the polarization rotation angles are $\alpha_1$ before and $\alpha_3$ after the two rotations, respectively.

Two successive and opposite coordinate system rotations $\beta_1>0$ and $\beta_2<0$ that take place in opposite directions are illustrated in FIG. 16. For clarity, the two polarization rotations are shown to have different magnitude, although in many cases it is desirable to have two equally large but opposite rotations.

FIG. 17 shows a method to sum up the two polarization rotations even if the two coordinate system rotations occur in opposite direction. This is based on the reflection of the polarization with respect to the y (or x) axis, which can be achieved by inducing a $\Delta\phi=\pi$ phase difference between the two polarization eigenmodes in waveguide 2. The original polarization (OP) is illustrated with a bold solid line at an angle $\alpha_1$ and the reflected final polarization (FP) with a double line at angle α3, respectively. Angles $α_2$ and $α'_2$ represent the polarization before and after the polarization reflection in waveguide 2.

In FIG. 18 is shown a special case of FIG. 15 where the two coordinate system rotations are supplementary, i.e. $β_1+β_2=π$. In this case the effective polarization rotation is zero, although the absolute phase of the light must still be taken into account if the polarization rotator is part of a phase sensitive waveguide circuit. Without any phase change between the two polarizations the total polarization rotation is π, i.e. effectively zero.

FIGS. 19 and 20 illustrate polarization rotation in the case of supplementary rotations when polarization is reflected between the two rotations. These figures provide a stepwise illustration of two rotations and one reflection, which is difficult to see in a single figure.

In FIG. 19 is shown linear polarization after the first coordinate system rotation between waveguides 1 and 2 by angle $β_1$, and a following reflection of the polarization with respect to the $y_2$ axis. The original and final polarization OP, FP angles are $α_1$ and $α'_2$, respectively.

In FIG. 20 is shown linear polarization after two successive coordinate system rotations ($β_1$ and $β_2$) between waveguides 1, 2 and 3, and the reflection of the polarization with respect to $y_2$ axis between the rotations. The initial polarization angle is $α_1$ and the final polarization angle is $α_3$. In this example the two rotations are supplementary ($β_2=π-β_1$).

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting. Reference, if any, to any art is not and should not be taken as an acknowledgment or any form of suggestion that this art forms part of the common general knowledge in any country.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Various embodiments and examples of the present invention may be referred to herein along with alternatives for the various components thereof. It is understood that such embodiments, examples, and alternatives are not to be construed as de facto

The invention claimed is:

1. A polarization rotator, comprising:
a first waveguide layer containing at least a first waveguide, said first waveguide having an input end and an output end;
a second waveguide layer having at least a second waveguide, said second waveguide having an input end and an output end;
at least a third waveguide in said first waveguide layer, said third waveguide having an input end and an output end;
at least a first vertical mirror element arranged at the end of at least one of said first and second waveguides to couple light between the output end of the first waveguide and the input end of the second waveguide, wherein the first vertical mirror element is vertical with respect to a light propagation in the first waveguide;
at least a second vertical mirror element arranged at the end of at least one of said second and third waveguides to couple light between the output end of the second waveguide and the input end of the third waveguide, wherein the second vertical mirror element is vertical with respect to a light propagation in the second waveguide, wherein
said second waveguide layer is perpendicular to said first waveguide layer, whereby the optical axis at the input end of said second waveguide is rotated in the second waveguide layer in a first angle, and whereby said first vertical mirror element is coupled to the input end of said second waveguide to couple light from the output end of the first waveguide to the input end of the second waveguide, and said second vertical mirror element is coupled to the output end of said second waveguide to couple light from the output end of the second waveguide to the input end of the third waveguide, and whereby the optical axis at the output end of said second waveguide is rotated in the second waveguide layer at a second angle in order to induce further rotation of polarization of light.

2. The polarization rotator according to claim 1, wherein said second waveguide includes horizontal light turning elements that turn the light horizontally in the second waveguide layer to allow coupling of light from the output of said first waveguide to the input of said third waveguide.

3. The polarization rotator according to claim 2, wherein said horizontal light turning elements adjust or compensate polarization dependent phase shifts in the polarization rotator.

4. The polarization rotator according to claim 1, wherein said third waveguide is oriented in the same direction as said first waveguide on said first waveguide layer.

5. The polarization rotator according to claim 1, wherein said third waveguide is oriented in the opposite direction as said first waveguide on said first waveguide layer.

6. The polarization rotator according to claim 2, wherein said second waveguide comprises straight waveguide sections and parallel input and output portions and said horizontal light turning elements.

7. The polarization rotator according to claim 6, wherein said straight waveguide sections and/or horizontal light turning elements are selected to have polarization dependent phase shifts that compensate or supplement polarization dependent phase shifts that are induced by said vertical mirror elements, thus allowing for rotation of linear input polarization into linear output polarization.

8. The polarization rotator according to claim 1, wherein the vertical mirror elements arranged at each end of said second waveguide are fabricated using additive manufacturing.

9. The polarization rotator according to claim 2, wherein the horizontal light turning elements are bends or horizontal TIR mirrors.

10. The polarization rotator according to claim 8, wherein the additive manufacturing is 3D printing or direct writing.

* * * * *